(12) United States Patent
Bhow

(10) Patent No.: US 8,649,817 B2
(45) Date of Patent: Feb. 11, 2014

(54) HEADSET CALL TRANSITION

(75) Inventor: Gunjan Dhanesh Bhow, Menlo Park, CA (US)

(73) Assignee: Plantronics, Inc., Santa Cruz, CA (US)

( * ) Notice: Subject to any disclaimer, the term of this patent is extended or adjusted under 35 U.S.C. 154(b) by 891 days.

(21) Appl. No.: 12/710,279

(22) Filed: Feb. 22, 2010

(65) Prior Publication Data

US 2011/0207447 A1 Aug. 25, 2011

(51) Int. Cl.
*H04M 1/00* (2006.01)

(52) U.S. Cl.
USPC .................. 455/552.1; 455/553.1; 455/569.1

(58) Field of Classification Search
USPC ................. 455/436–444, 552.1–553.1, 569.1
See application file for complete search history.

(56) References Cited

U.S. PATENT DOCUMENTS

| 7,424,288 B2 | 9/2008 | Jung et al. |
| 2003/0003900 A1 | 1/2003 | Goss et al. |
| 2003/0036386 A1* | 2/2003 | Harrison ........................ 455/438 |
| 2003/0073431 A1 | 4/2003 | Dorenbosch |
| 2006/0183425 A1* | 8/2006 | Seshadri et al. ............. 455/41.3 |
| 2007/0015535 A1* | 1/2007 | LaBauve et al. ............ 455/552.1 |
| 2008/0085746 A1* | 4/2008 | Ray et al. .................... 455/575.1 |
| 2008/0261524 A1* | 10/2008 | Grushkevich ................ 455/41.2 |

OTHER PUBLICATIONS

Microsoft Office Communicator 2007 R2 Getting Started Guide, found at URL <http://its.vanderbilt.edu/files/documents/Communicator_2007_R2_Getting_Started_Guide.pdf> dated Dec. 2008.

* cited by examiner

*Primary Examiner* — Steven Lim
(74) *Attorney, Agent, or Firm* — Chuang Intellectual Property Law

(57) ABSTRACT

Systems and methods for transitioning calls using a headset are presented. In one example, a headset is operable to form a first local wireless link with a first telecommunications device and form a second local wireless link with a second telecommunications device. The headset is operable to switch to a call transition mode, where during the call transition mode a user interface is adapted to receive a transition call input action. Responsive to the transition call input action, a call with a call participant on the first telecommunications device is terminated and a call with the call participant on the second telecommunications device is connected.

25 Claims, 10 Drawing Sheets

HEADSET CALL TRANSITION

BACKGROUND OF THE INVENTION

Most individuals have several telephony devices (also referred to herein as "telephones", or "telecommunications devices") available to them to make and receive calls. Mobile telephones, such as cellular telephones, have become ubiquitous as users enjoy the convenience and portability they provide. In the home or office environment, users still typically maintain their traditional home desktop landline or office landline telephone using the traditional public switched telephone network (PSTN). More recently, users have started to utilize Voice over Internet Protocol (VoIP) telephones. The VoIP telephone may be a personal computer (PC) executing a VoIP application such as Skype that provides telephone communications service over the Internet.

VoIP telephones are popular with users as they provide telephony services for free or at reduced costs, including calls to international destinations. Furthermore, when implemented on a PC in the office, they typically are plugged into an A/C power source, thereby providing unlimited talk time. However, it is not uncommon for a user conducting a call with a VoIP telephone to need to leave the office and vicinity of the PC before completing the call. In such a situation, the user typically wishes to continue the call using his mobile phone.

In the prior art, the user typically terminates the call on the VoIP telephone and then either dials the other call participant using the mobile phone or has the call participant dial the user on his mobile phone. As a result, there is an interruption in the conversation between the user and the call participant while the call is being dialed on the mobile phone and the call is being connected. Furthermore, either the user or the call participant must manually locate or dial the user's mobile phone number. In a scenario where the user is participating in a conference call, the delay in redialing into the conference call is particularly problematic as everyone on the conference call must pause while the user redials and reconnects the call. Alternatively, the user misses part of the conversation if the conference call participants do not pause while the user reconnects to the conference call.

As a result, there is a need for improved methods and systems for enabling transitioning of calls between telephony devices.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
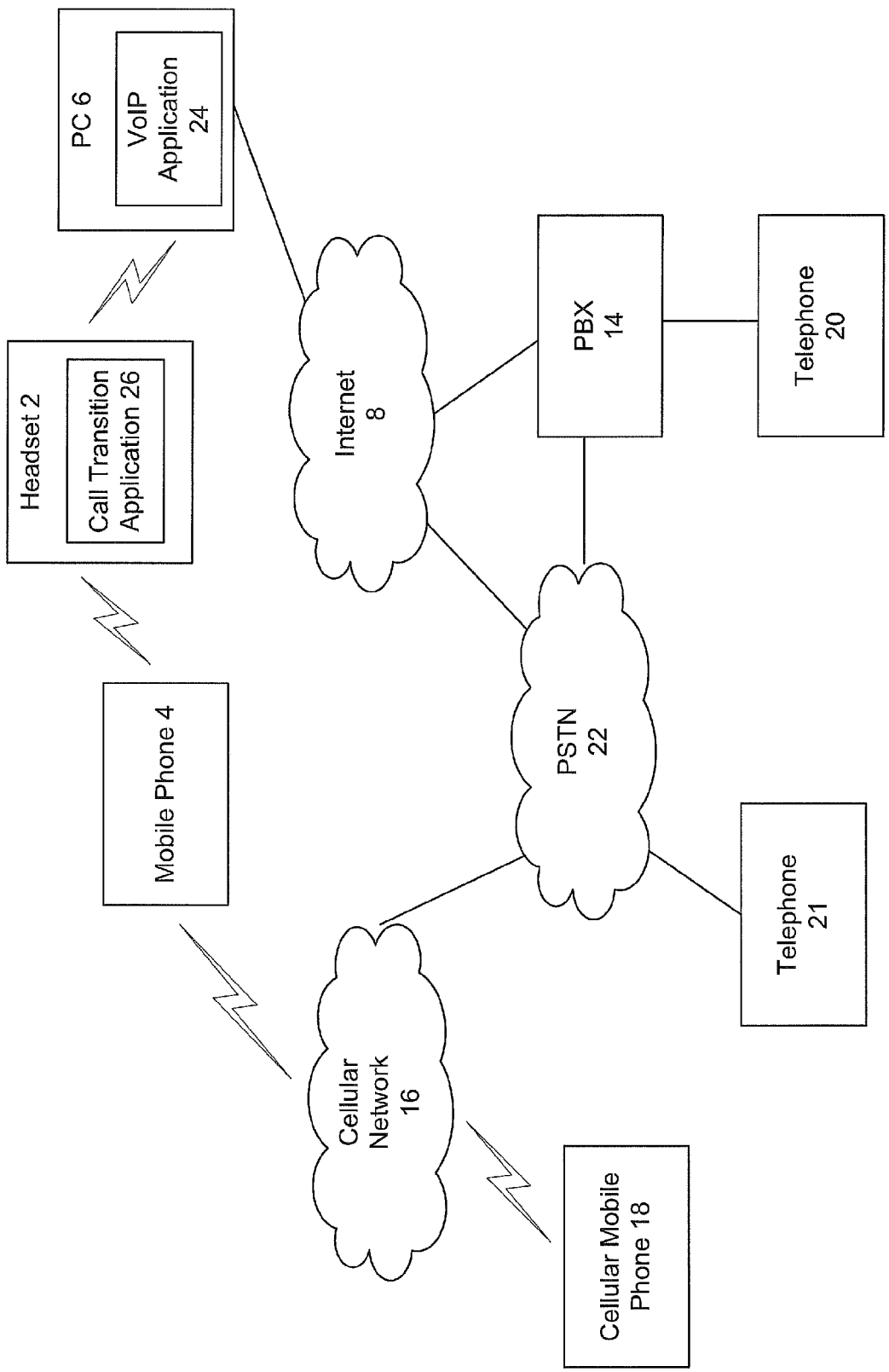
FIG. 1 illustrates a system for transitioning a call using a headset in one example.

Methods and apparatuses for seamless call transition utilizing a headset are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a headset is adapted to transition a call from a first telecommunications device, such as a VoIP telephone, to a second telecommunications device, such as a cellular mobile phone. The headset includes a call transition mode of operation. While in the call transition mode, depression of the call answer button or equivalent action at the headset is modified to perform the following actions: (1) a call currently being conducted with a call participant using the headset and VoIP telephone is terminated, and (2) a call with the same call participant is connected using the headset and mobile phone. The call using the mobile phone is a continuation of the conversation that the user was conducting using the PC. The call terminate and call connection actions can be performed in either order, with the switch taking only microseconds thereby providing a transparent and seamless transition.

The transition process is advantageous in that it prevents or minimizes "blackout" periods whereby audio communication between the user and other call participants must be suspended, and provides a convenient automated mechanism by which a call can be transitioned. In a further example, the need for depression of the call answer button is eliminated, whereby the call transition is performed automatically upon receipt of an incoming call during the call transition mode.

In one example, a headset includes a speaker, a microphone, a wireless communications transceiver operable to form a first local wireless link with a first telecommunications device and form a second local wireless link with a second telecommunications device, and a user interface. The headset further includes a processor operable to switch the headset to a call transition mode, where during the call transition mode the user interface is adapted to receive a transition call input action from a headset user. Responsive to the transition call input action the processor terminates a call with a call participant on the first telecommunications device and connects a call with the call participant on the second telecommunications device.

In one example, a method for transitioning a call using a headset includes establishing a first wireless link with a first telecommunications device, establishing a second wireless link with a second telecommunications device, and conducting a call with a call participant over the first wireless link. A call transition mode is entered, the call transition mode activating a transition call function command selectable at a headset user interface input. An incoming call notification is received over the second wireless link, and a transition call function command selected at the headset user interface input is received. Responsive to receiving the transition call function command, the call with the call participant over the first wireless link is terminated and the call with the call participant over the second wireless link is connected.

In one example, a headset includes a speaker, a microphone, a wireless communications transceiver operable to form a first wireless link with a first telecommunications device and form a second wireless link with a second telecommunications device, a user interface, and a processor. The headset further includes a memory storing a call transition application operable to switch the headset to a call transition mode, where during the call transition mode the call transition application terminates a call with a call participant on the first telecommunications device and connects a call with the call participant on the second telecommunications device upon receipt of an incoming call notification from the second telecommunications device.

In one example, a method for transitioning a call using a headset includes conducting a call with a call participant over a first wireless link with a first telecommunications device, and entering a call transition mode. The call transition mode is adapted to automatically transition a call upon receipt of an associated incoming call notification over a second wireless link with a second telecommunications device. An incoming call notification is received over the second wireless link, and the call with the call participant is transitioned from the first telecommunications device to the second telecommunications device.

In one example, a computer readable medium stores executable instructions that when executed by a processor cause the processor to perform a method for operating a headset in a call transition mode, where during the call transition mode the user interface is adapted to receive a transition call input action from a headset user. The executable instructions include instructions to terminate a call with a call participant on a first wireless link and connect a call with the call participant on a second wireless link responsive to receiving the transition call input action from the headset user. In a further example, the executable instructions include instructions to automatically terminate a call with a call participant on a first wireless link and connect a call with the call participant on a second wireless link during the call transition mode upon receipt of an incoming call notification without the need to receive a transition call input action from the headset user.

FIG. 1 illustrates a system for transitioning a call using a headset in one example. The system includes a headset 2 operating in multipoint mode paired with both a mobile phone 4 and a telecommunications device such as a personal computer (PC) 6 executing a VoIP application 24 (also referred to herein as a "VoIP telephone" or a "softphone"). Personal computer 6 may, for example, be a notebook computer, desktop computer, or PDA type device. Mobile phone 4 is in wireless communication with cellular network 16, and can receive incoming calls via the cellular network 16 initiated from a private branch exchange (PBX) 14. Mobile phone 4 may receive incoming calls from the public switched telephone network (PSTN) 22 through cellular network 16. A call transition application 26 residing on headset 2 provides for seamless transition of a call being conducted using VoIP application 24 on PC 6 to mobile phone 4 or vice-versa.

Figure 2:
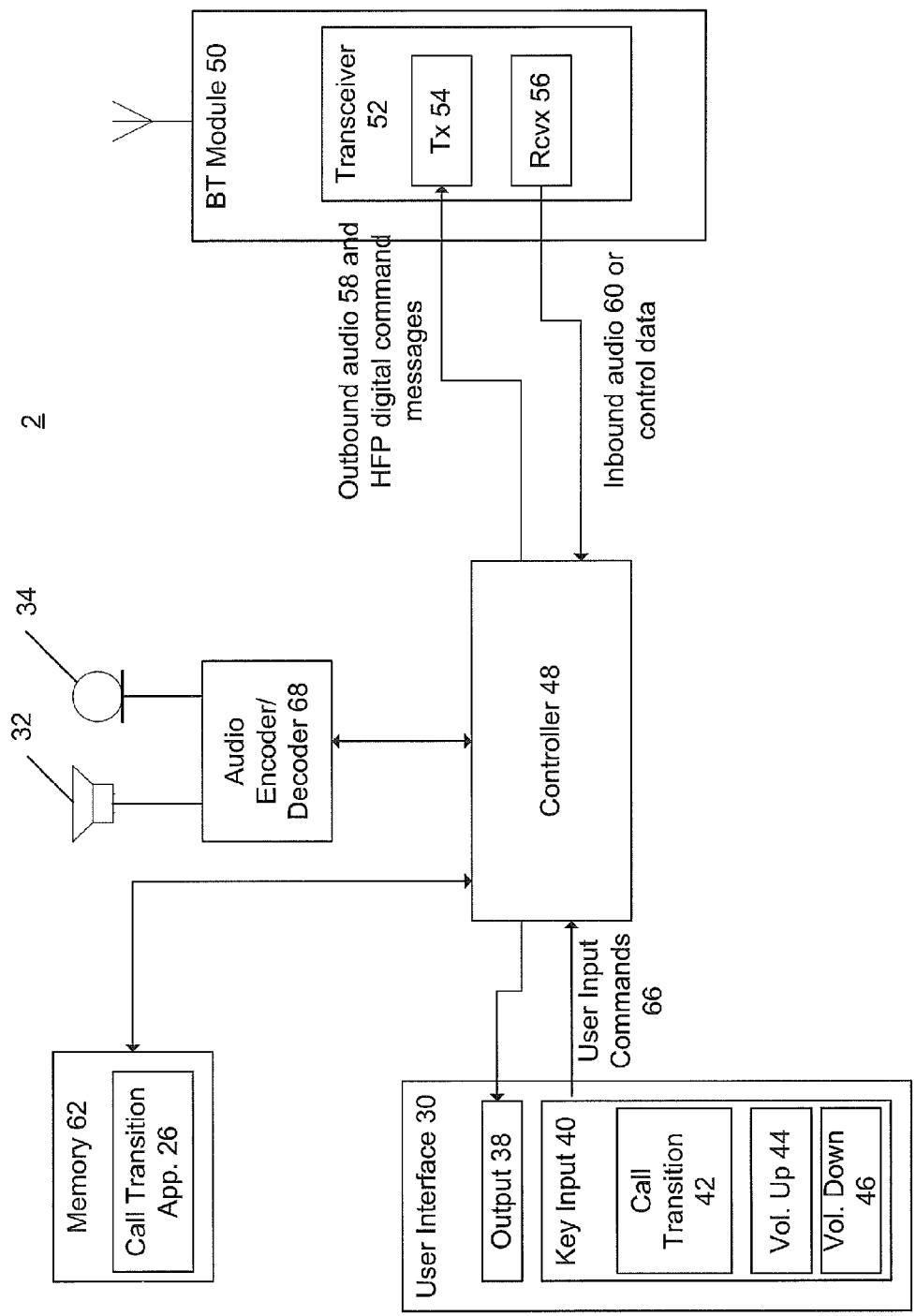
FIG. 2 illustrates a simplified block diagram of the headset shown in FIG. 1 where the headset utilizes Bluetooth.

FIG. 2 illustrates a simplified block diagram of the headset shown in FIG. 1 where the headset 2 utilizes the Bluetooth protocol. In further examples, other wireless protocols may be utilized, such as IEEE 802.11 or digital enhanced cordless telecommunications (DECT). For clarity, not all components of the headset 2 are illustrated. The headset 2 includes a Bluetooth module 50, an audio encoder/decoder 68, memory 62, controller 48, user interface 30, speaker 32, and microphone 34. Controller 48 may include a variety of processors, such as digital signal processors.

User interface 30 includes a key input 40. Key input 40 includes a selectively enabled call transition function 42, volume up input 44 and volume down input 46. Key input 40 also includes a hookswitch function. The user interface 30 may also include one or more output interfaces 38 typical to headsets, such as LED indicators or some form of a display. The speaker 32 may also be used as an interface output.

In one example, call transition function 42 is a user input button activated during a headset call transition mode used to transfer a call with a call participant from VoIP application 24 to mobile phone 4. During normal operation, this same user input button may function as a typical call answer and call terminate input interface.

Bluetooth module 50 includes a transceiver 52 having a transmitter 54 and a receiver 56. In the present example, Bluetooth module 50 receives and transmits a wireless signal utilizing the Bluetooth protocol Hands-Free Profile. The wireless signal transmitted by transmitter 54 includes outbound audio 58 and Hands-Free Profile command messages received from controller 48. Inbound audio 60 and control data is received by receiver 56 and sent to controller 48. Audio encoder/decoder 68 is used for processing a digital audio signal and an analog audio signal as known in the art.

The Bluetooth transceiver 52 is operable to simultaneously form Bluetooth ACL and SCO links with PC 6 and mobile phone 4. Controller 48 is operable to receive user input commands 130 from user interface 30 and convert these commands to Hands-Free Profile digital command messages. In one example, controller 48 is part of a Bluetooth chip set. These Hands-Free Profile digital command messages are sent to Bluetooth module 50 for wireless transmission using Bluetooth module 50. Controller 48 also receives inbound audio or audio files for output by speaker 32 following decoding by audio encoder/decoder 68. User interface 30, and in particular call transition function 42, can be any combinations of visual interfaces, tactile interfaces, and/or an audio interface that allow the user to input commands.

Memory 62 stores a call transition application 26 executed by controller 48 to perform call transition functions as described herein. Such call transition functions may be executed by the headset user with the call transition function 42 key input. In one example, the call transition application 26 enables the headset 2 to switch to a call transition mode, where during the call transition mode the user interface 30 is adapted to receive a call transition function 42 input action from a headset user. Responsive to the call transition function 42 input action, the headset 2 terminates an active call with a call participant on the PC 6 and connects a call with the same call participant on the mobile phone 4. In one example, the call transition function 42 input action is a single action input, such as a single button press. Memory 62 is also used to store digital data, and can take a variety of well known forms, such as flash memory or memory integrated with controller 48.

In operation, referring to FIG. 1 and FIG. 2 together, a user of headset 2 may conduct a call using VoIP application 24 at PC 6 with a call participant at a cellular mobile phone 18 via cellular network 16, telephone 21 via PSTN 22, or telephone 20 via PBX 14. Alternatively, the user of headset 2 may conduct a call using VoIP application 24 with several participants simultaneously, as in the case of a conference call. During the call, the user decides that he desires to transition the call to his mobile phone 4. For example, the user may wish to transition the call in order to become mobile while continuing to speak with the call participant or call participants.

In order to transition the call, in one example, the user initiates a call transfer function at VoIP application 24. Where the call transfer function is initiated at VoIP application 24, the PC 6 sends a call transition signal to headset 2 to enter a call transition mode (also referred to herein as a call handoff or call transfer mode). The call transition signal notifies headset 2 to expect an incoming call at mobile phone 4 associated with the call being currently conducted with VoIP application 24. In a further example, the user may initiate the call transfer function at the headset 2, upon which the headset 2 enters the call transition mode.

In one example, upon receiving the call transition signal, the headset 2 enters the call transition mode for a predetermined amount of time, such as for approximately 5-10 seconds, during which depression of the call transition function button upon receipt of a call on the mobile phone terminates the call with PC 6 and connects the call with mobile phone 4. During call transition mode, the headset 2 presumes or verifies that the incoming call on the mobile phone is related to the current call being conducted with the PC 6. In other words, the headset 2 is aware of the relationship between the current PC call and the incoming mobile call. The headset 2 treats the incoming mobile call as a related event, and therefore can automatically terminate the PC call when the mobile call is connected.

In one example, the incoming call at mobile phone 4 is received from PBX 14. Following user initiation of the call transfer function at either PC 6 or headset 2, the PC 6 sends a call transfer instruction to PBX 14. The PBX 14 includes a variety of calling features and capabilities. For example, PBX 14 may include capabilities such as call waiting, call transfer, call forwarding, and autodialing. In operation, the PBX 14 receives the call transfer function command and dials the mobile phone 4. In one example, the user's mobile phone number is previously stored at PC 6 or PBX 14 for use by PBX 14 so that the user need not re-enter the mobile number in order to transition the call.

During this process, the call with the call participant using PC 6 continues. Mobile phone 4 receives the call from PBX 14 and sends an incoming call notification to headset 2. Since the headset 2 has previously entered the call transition mode as described previously, a user action at the headset 2 to answer the incoming call operates to connect the call received from the PBX 14 between the call participant and the headset 2 and terminate the call with the call participant being conducted with PC 6.

Following the call transition, the call with the call participant previously being conducted using headset 2 and PC 6 continues using headset 2 and mobile phone 4. In this manner, the call transition from the PC 6 to the user mobile phone 4 is seamless and the call participant or conference call participants are not aware of the transfer. Headset 2 then reverts back to a normal operation mode from call transition mode while on the mobile call.

In a further example, during call transition mode, no user action is required at headset 2 to answer the incoming call from mobile phone 4. During the call transition mode, the call transition application 26 automatically terminates a call with a call participant on the PC 6 and connects a call with the call participant on the mobile phone 4 upon receipt of an incoming call notification from the mobile phone 4. In this example, some form of verification may be employed to verify that the incoming mobile call is related to the current PC call. Call verification addresses the scenario where an unrelated incoming call is received at the mobile phone 4 while the headset 2 is in call transition mode, and is utilized to prevent automatic switching to the mobile phone 4 and termination of the PC call where the incoming call is unrelated to the PC call. Such verification may include using caller ID. For example, caller ID data received with the incoming call may be matched to name or number data associated with PBX 14 to verify the incoming call is related.

Figure 3:
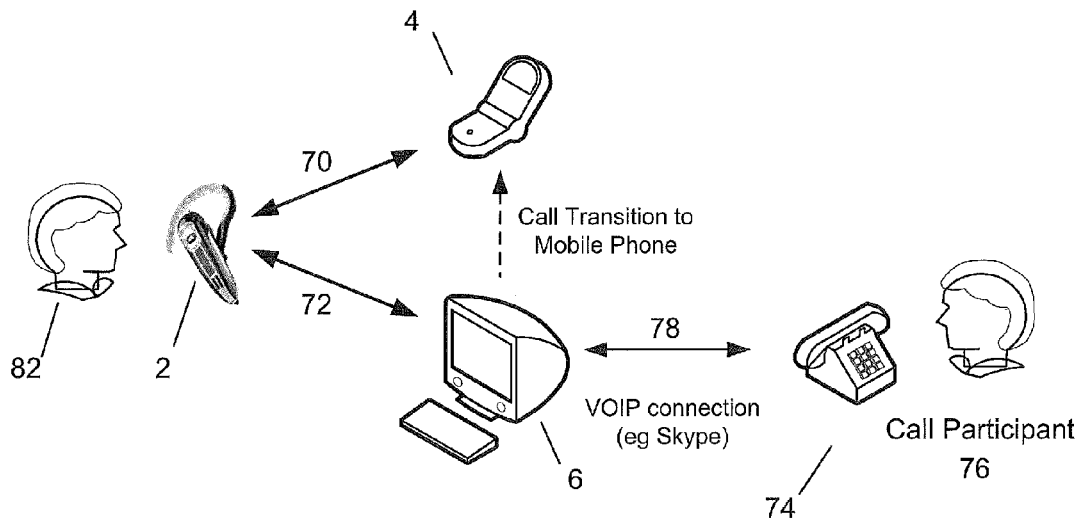
FIG. 3 illustrates the system shown in FIG. 1 in one example usage scenario.

FIG. 3 illustrates the system shown in FIG. 1 in one example usage scenario. In the scenario shown in FIG. 3, a headset wearer 82 using headset 2 is able to form a local wireless link 72 with a PC 6, where the PC 6 is in communication via a VoIP communication link 78 with a far end desk telephone 74. The headset wearer 82 using headset 2 is also able to form a local wireless link 70 with a mobile phone 4. In operation, the headset wearer 82 transitions a call between the headset wearer 82 and a call participant 76 to local wireless link 70 from local wireless link 72. Once the call is transitioned to the wireless link 70 with mobile phone 4, the headset wearer 82 can continue the call with call participant 76 utilizing the mobility of mobile phone 4. In a further example, the mobile phone 4 shown in FIG. 3 is replaced with a desktop-based phone connected to the PBX via an IP-network or another IP-based dedicated calling device. The headset wearer 82 can transition a call to the desktop-based phone or other IP-based dedicated calling device from PC 6.

Although a PC 6 is illustrated in FIG. 3, one of ordinary skill in the art will recognize that a variety of computing devices may be used to implement VoIP communication link 78. In one example, where the headset 2 is a Bluetooth headset, the headset 2 communicates with a USB Bluetooth module (also referred to as a dongle) via the local wireless link 72, where the USB Bluetooth module includes a USB interface which may be inserted into a USB interface of the PC 6.

The USB Bluetooth module at the PC 6 includes a Bluetooth audio gateway which is the gateway for both input audio and output audio. The Bluetooth headset 2 acts as a remote audio input and output mechanism for the Bluetooth audio gateway. Audio signals provided by the VoIP application 24 shown in FIG. 1 are sent to the USB Bluetooth module and then wirelessly sent to headset 2. Audio signals from the headset 2 are sent via the USB Bluetooth module to the VoIP application 24. The VoIP application 24 operates to handle bi-directional IP based telephony between the PC 6 and the Internet.

Figure 4:
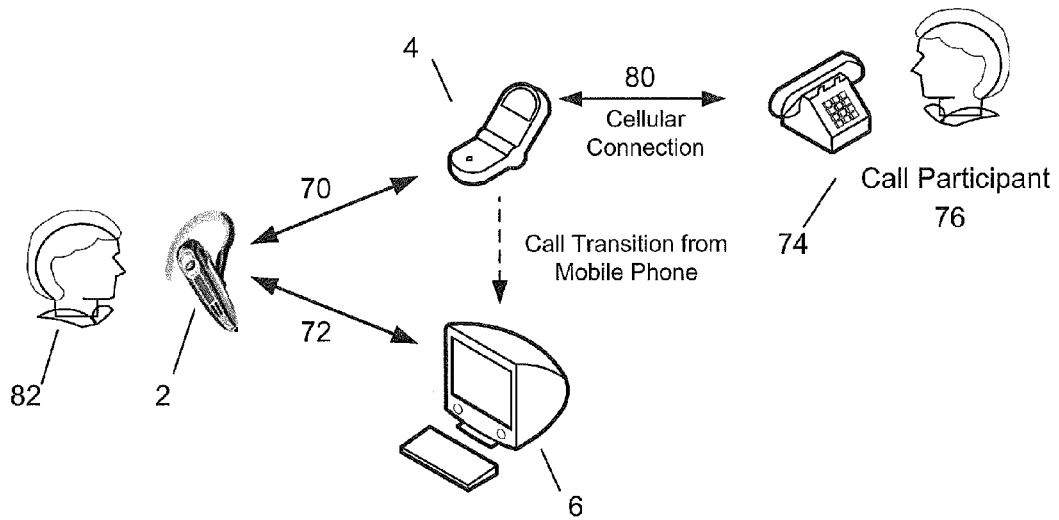
FIG. 4 illustrates the system shown in FIG. 1 in one example usage scenario.

FIG. 4 illustrates the system shown in FIG. 1 in a further example usage scenario. In the scenario shown in FIG. 4, a headset wearer 82 using headset 2 is able to form a local wireless link 70 with a mobile phone 4, where the mobile phone 4 is in communication with a far end desk telephone 74 via a cellular communication link 80. The headset wearer 82 can transition a call between the headset wearer 82 and call participant 76 to a local wireless link 72 with a PC 6 from local wireless link 70. In one example, mobile phone 4 is a smartphone having data connection capabilities and a user interface capable of initiating the call transfer. To initiate the call transfer function, the user interface informs a central call management system such as a PBX over the data connection.

In operation, a user of headset 2 is conducting a mobile phone call with call participant 76 using mobile phone 4. During the call, the user decides that he desires to transition the call to PC 6 executing a VoIP application 24. In one example, in order to transition the call, the user initiates a call transfer function at mobile phone 4. Where the call transfer function is initiated at mobile phone 4, the mobile phone 4 sends a call transition signal to headset 2 to enter a call transition mode. The call transition signal notifies headset 2 to expect an incoming call at PC 6 associated with the call being currently conducted with mobile phone 4. In a further example, the user may initiate the call transfer function at the PC 6 or the headset 2, upon which the headset 2 enters the call transition mode. Operation of the headset 2 in call transition mode is similar to that as described previously in other examples.

In one example, upon receiving the call transition signal, the headset 2 enters the call transition mode for a predetermined amount of time, such as for approximately 5-10 seconds, during which depression of the call transition function button upon receipt of a call on the PC 6 terminates the call with mobile phone 4 and connects the call with the VoIP application 24 at PC 6. During call transition mode, the headset 2 presumes or verifies that the incoming call on the mobile phone is related to the current call being conducted with the mobile phone 4. In other words, the headset 2 is aware of the relationship between the current mobile phone call and the incoming PC call. The headset treats the incoming PC call as a related event, and therefore can automatically terminate the mobile phone call when the PC call is connected.

In one example, the incoming call at PC 6 is received from mobile phone 4. Following user initiation of the call transfer function, the mobile phone 4 dials the PC 6. The user's PC phone number is previously stored at the mobile phone 4. During this process, the call with the call participant using mobile phone 4 continues. PC 6 receives the call from mobile phone 4 and sends an incoming call notification to headset 2. Since the headset 2 has previously entered the call transition mode as described previously, a user action at the headset 2 to answer the incoming call operates to connect the call using PC 6 and terminate the call with the call participant 76 being conducted with mobile phone 4.

Following the call transition, the call with the call participant 76 previously being conducted using headset 2 and mobile phone 4 continues using headset 2 and PC 6. In this manner, the call transition from the mobile phone 4 to the PC 6 is seamless and the call participant or conference call participants are not aware of the transfer. Headset 2 then reverts back to a normal operation mode from call transition mode while on the mobile call.

In a further example, during call transition mode, no user action is required at headset 2 to answer the incoming call from PC 6. During the call transition mode, the headset call transition application automatically terminates a call with the call participant 76 on the mobile phone 4 and connects a call with the call participant 76 on the PC 6 upon receipt of an incoming call notification from the PC 6. In this example, some form of verification as previously described may be employed to verify that the incoming PC call is related to the current mobile phone call. Once the call is transitioned to PC 6, the headset wearer 82 can continue the call with call participant 76, thereby taking advantage of increased talk time and call clarity provided by PC 6. In a further example, PC 6 shown in FIG. 4 is replaced with a deskphone or another desktop device with network connectivity to which a call is transitioned to from mobile phone 4.

Figure 5:
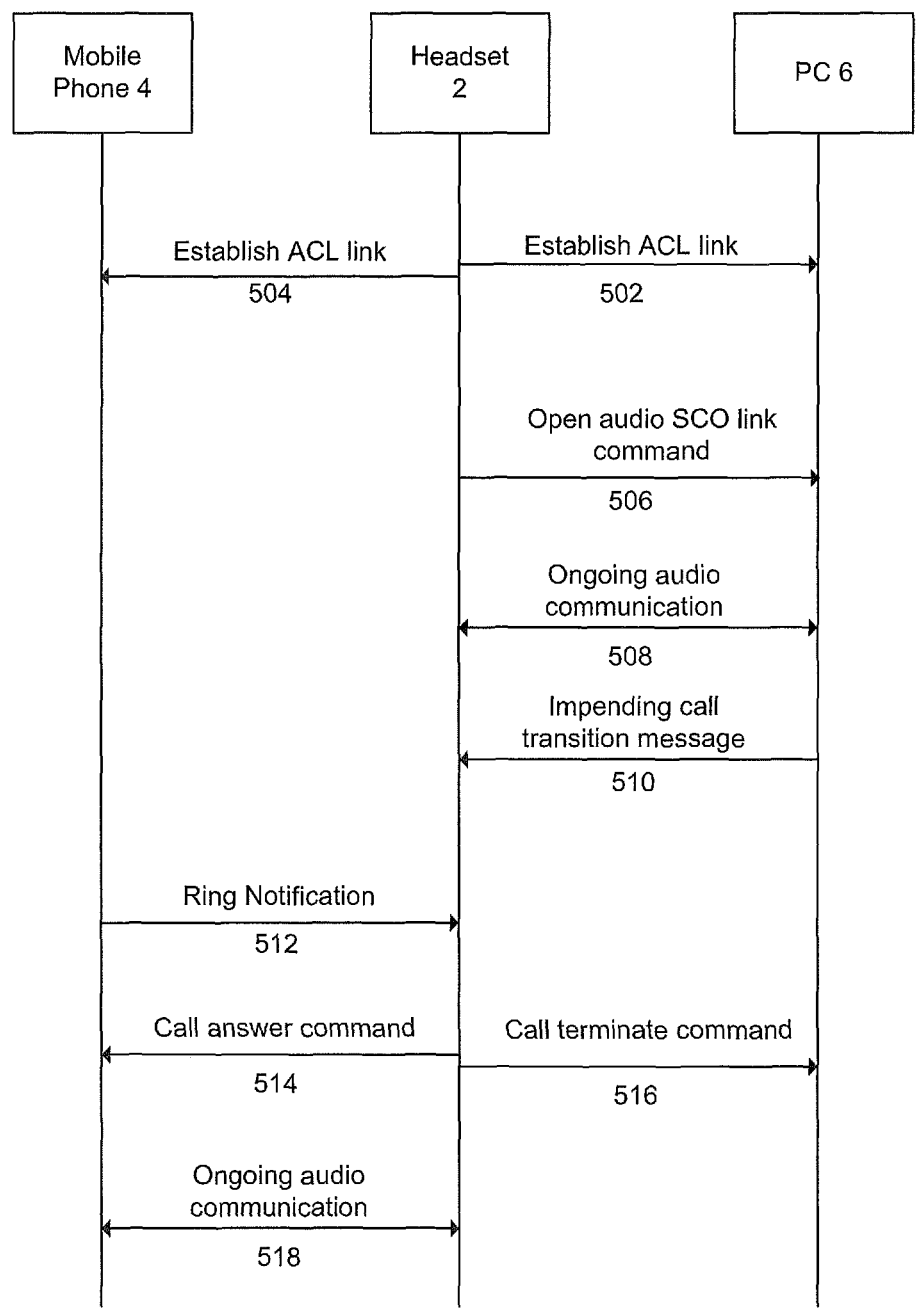
FIG. 5 illustrates transitioning a call with a call participant from a VoIP telephone to a mobile phone in a Bluetooth implementation example.

FIG. 5 illustrates transitioning a call with a call participant from a PC 6 to a mobile phone 4 in a Bluetooth headset implementation example. At step 502, the headset 2 initiates connection establishment with a PC 6 to form an ACL link. At step 504, the headset 2 initiates connection establishment with a mobile phone 4 to form an ACL link. Both the ACL link with the PC 6 and the mobile phone 4 are simultaneously active.

When a call is initiated or received at PC 6, at step 506 the headset 2 issues an open audio SCO link command to the PC 6. At step 508, ongoing audio communication over the open SCO link occurs between PC 6 and headset 2. When the user wishes to transition a call, the user initiates a transition call action at either PC 6 or headset 2. If the action is received at PC 6, at step 510 the PC 6 issues an impending call transition message to headset 2 instructing headset 2 to enter a call transition mode. The call transition message sent from the PC 6 to the headset 2 instructing the headset 2 to enter call transition mode is sent over the ACL link.

At step 512, when the incoming call is received at mobile phone 4, the mobile phone 4 sends the headset 2 notification of the incoming call. The mobile phone 4 performs an inquiry and paging process to locate the headset 2 and notify the headset 2 a call has been received. Upon receipt of the incoming call, the headset 2 opens a SCO link with the mobile phone 4 automatically. The mobile phone 4 sends the ring notification to the headset 2 over the SCO link.

When the user answers the call during call transition mode by pressing the call transition function button, at step 514, the headset 2 sends a call answer/pickup AT command to mobile phone 4, instructing the mobile phone 4 to pickup the call. The incoming call is picked up and the conversation begins.

At step 516, headset 2 sends a call terminate command to the PC 6 over the SCO link with the PC 6 responsive to the user call transition function action. Prior to termination of the call with the PC 6, the user may continue his conversation with the call participant. The PC 6 then terminates the SCO link between the PC 6 and the headset 2. At step 518, ongoing audio communication over the open SCO link occurs between mobile phone 4 and headset 2.

Figure 6A:
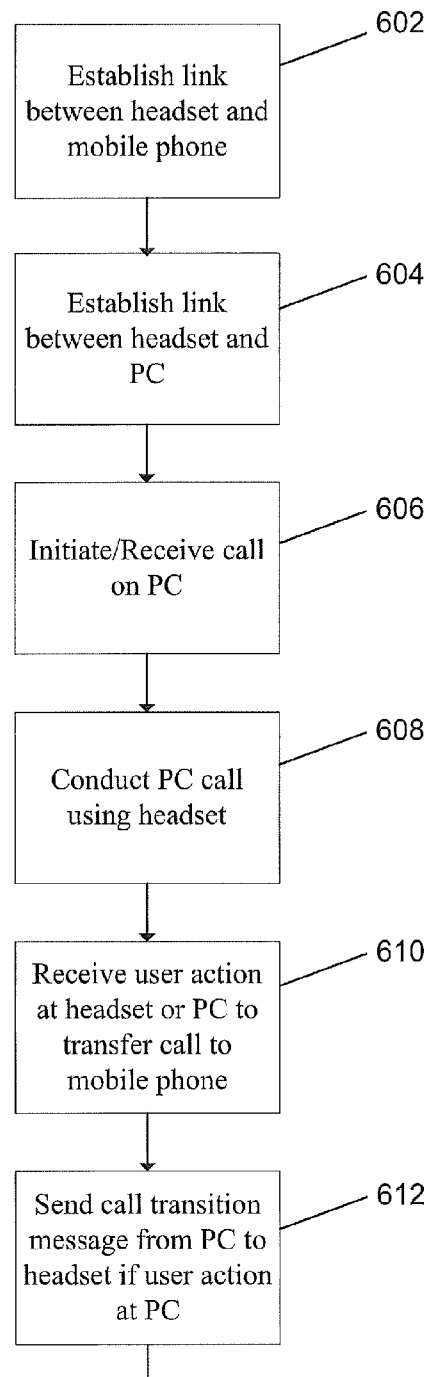
FIGS. 6A-6B are a flow diagram illustrating a call transition process using a headset in one example.
Figure 6B:
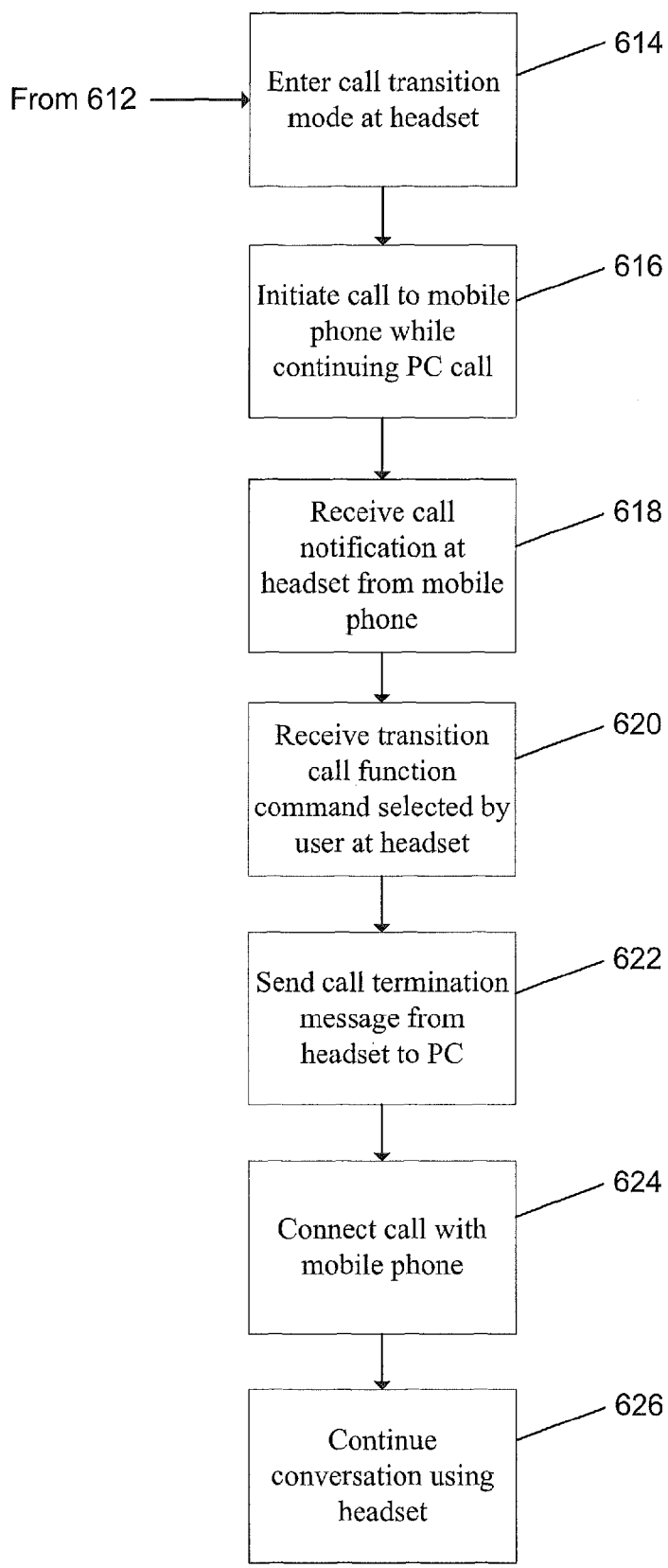

FIGS. 6A-6B are a flow diagram illustrating a call transition process using a headset in one example. At block 602, a wireless link is established between a headset and a mobile phone. At block 604, a wireless link is established between the headset and a personal computer executing a VoIP application. At block 606, a PC call is initiated or received with a call participant using the PC VoIP application. At block 608, the PC call is conducted over the wireless link between the headset and the PC using the headset. At block 610, a user action is received at either the headset user interface or the PC user interface to transfer the current call to the mobile phone.

At block 612, a call transition message is sent from the PC to the headset if the user action at block 610 is at the PC. At block 614, the headset enters a call transition mode. The call transition mode activates a transition call function command selectable at a headset user interface input. In one example, the call transition mode is active for approximately five to ten seconds, following which the headset reverts to a normal operation mode suspending the transition call function command selectable at the headset user interface input.

At block 616, a call is initiated to the mobile phone while the PC call between the headset and PC continues. At block 618, a call notification is received at the headset from the mobile phone over the wireless link between the headset and the mobile phone. In one example, it is verified that this incoming call notification is associated with the current call with the call participant over the wireless link with the PC. An example verification process is discussed below in reference to FIG. 7. At block 620, a transition call function command selected by the user at the headset is received. At block 622, responsive to receiving the transition call function command, a call termination message is sent from the headset to the PC, and at block 624, the call is connected between the headset and the mobile phone. At block 626, the conversation with the call participant is continued using the headset and the mobile phone.

Figure 7A:
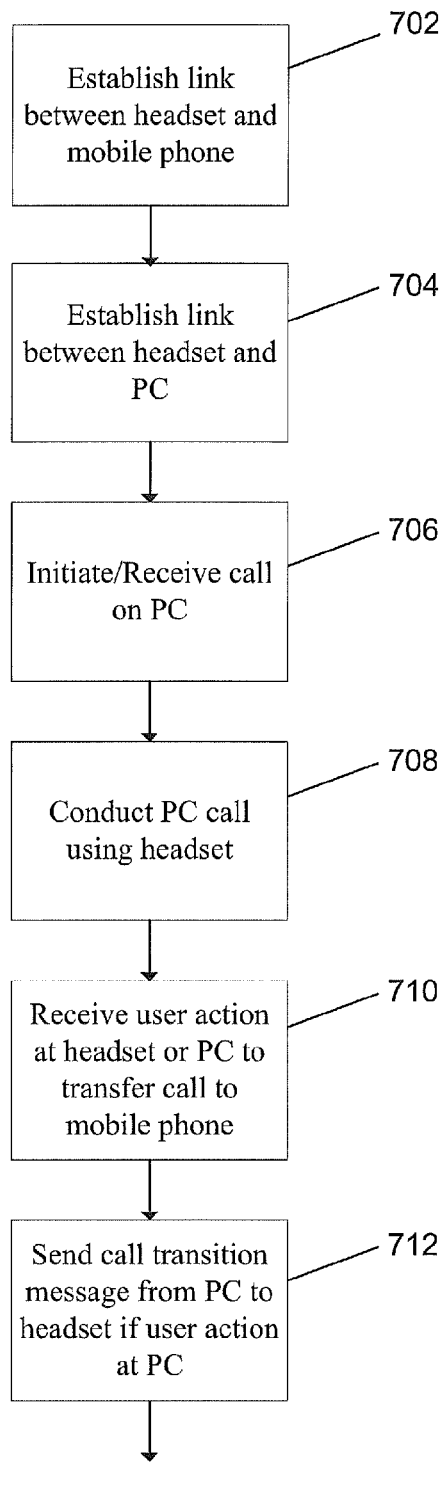
FIGS. 7A-7C are a flow diagram illustrating a call transition process using a headset in a further example.
Figure 7B:
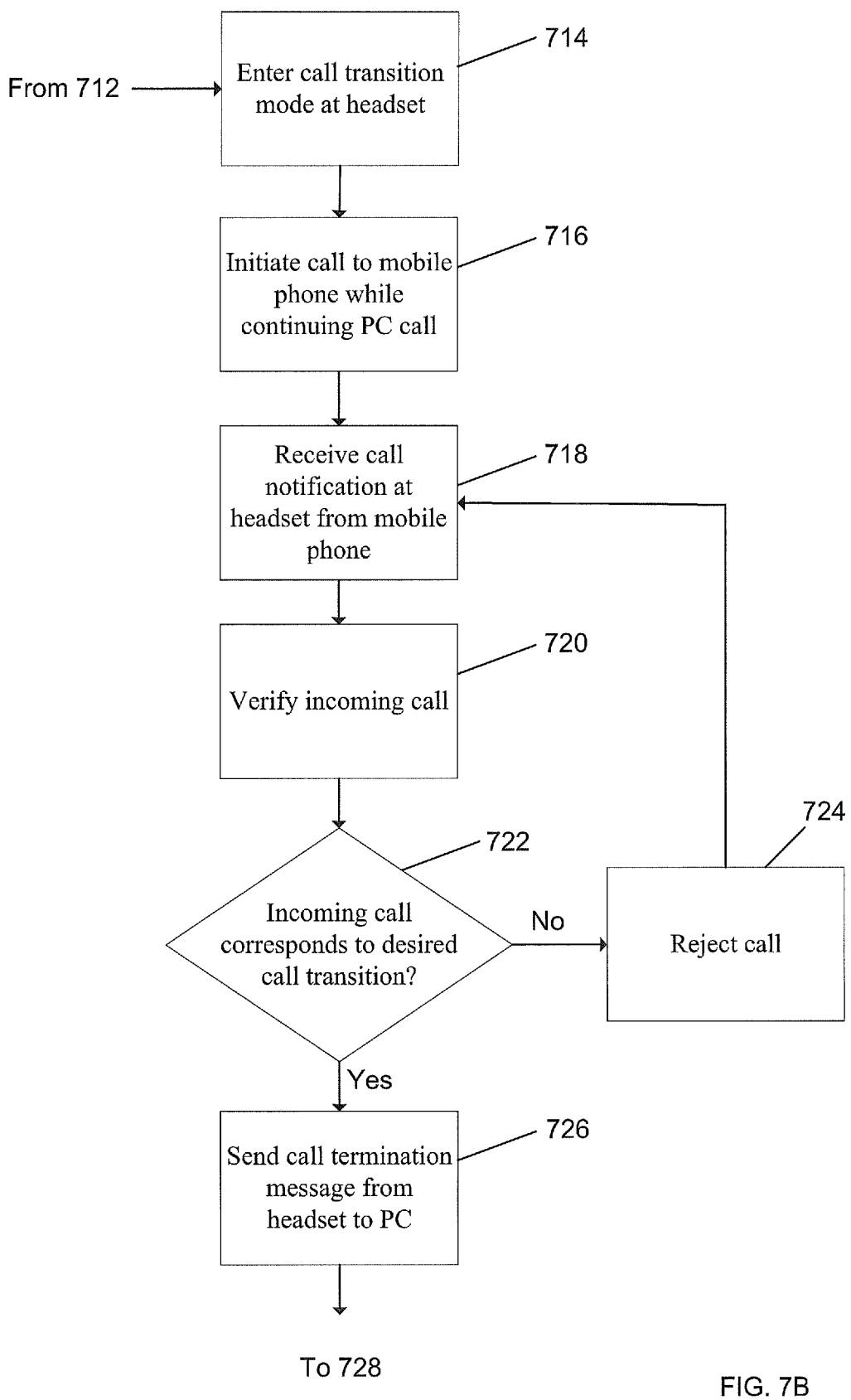
Figure 7C:
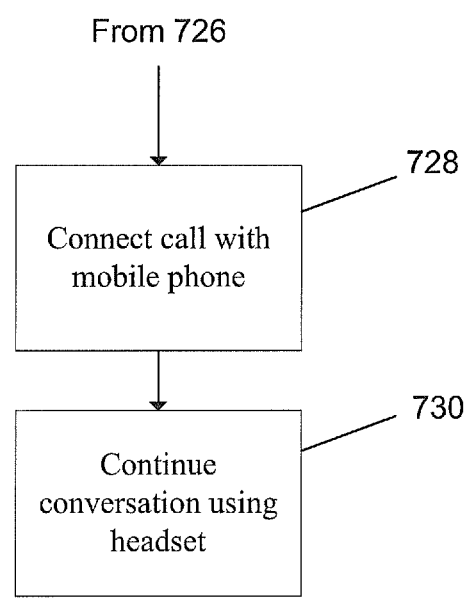

FIGS. 7A-7C are a flow diagram illustrating a call transition process using a headset in a further example. At block 702, a wireless link is established between a headset and a mobile phone. At block 704, a wireless link is established between the headset and a personal computer executing a VoIP application. At block 706, a PC call is initiated or received with a call participant using the PC VoIP application. At block 708, the PC call is conducted over the wireless link between the headset and the PC using the headset. At block 710, a user action is received at either the headset user interface or the PC user interface to transfer the current call to the mobile phone.

At block 712, a call transition message is sent from the PC to the headset if the user action at block 710 is at the PC. At block 714, the headset enters a call transition mode. In this example, the call transition mode activates an automated process by which the headset automatically answers and connects an incoming call from the mobile phone and terminates the PC call, thereby transitioning the call. In one example, the call transition mode is active for approximately five to ten seconds, following which the headset reverts to a normal operation mode suspending the automated call transition process.

At block 716, a call is initiated to the mobile phone while the PC call between the headset and PC continues. At block 718, a call notification is received at the headset from the mobile phone over the wireless link between the headset and the mobile phone. At block 720, it is verified by the headset whether the incoming call notification is associated with the current call with the call participant over the wireless link with the PC. In one example, verifying the incoming call notification from the mobile phone is associated with the PC call includes matching caller identification data received with the incoming call notification to pre-determined identification data associated with the PC or PBX to which the PC is connected.

At decision block 722, it is determined whether the incoming call corresponds to the desired call transition. If no at decision block 722, at block 724 the incoming call notification is rejected. Following block 724, the process returns to block 718. If yes at decision block 722, at block 726, no user action is required and a call termination message is sent from the headset to the PC to terminate the PC call being conducted over the wireless link between the PC and the headset. At block 728, the call is connected between the headset and the mobile phone. At block 730, the conversation with the call participant is continued over the wireless link between the mobile phone and the headset using the headset.

Although certain examples have been described herein utilizing a PC executing a VoIP application, in further examples the PC is replaced with a different telecommunication device. For example, the PC executing a VoIP application may be replaced with a mobile cellular network telephone, or public switched telephone network telephone. Similarly, while certain examples have been described herein utilizing a mobile phone to which a call is transitioned, in further examples the mobile phone is replaced with a different telecommunication device. For example, the mobile phone may be replaced with a VoIP telephone or public switched telephone network telephone.

Figure 8A:
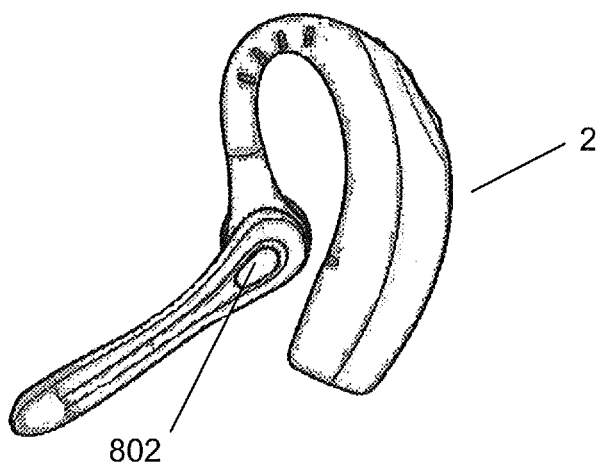
FIGS. 8A and 8B illustrate a front and side perspective view of the headset shown in FIG. 2 in one example.
Figure 8B:
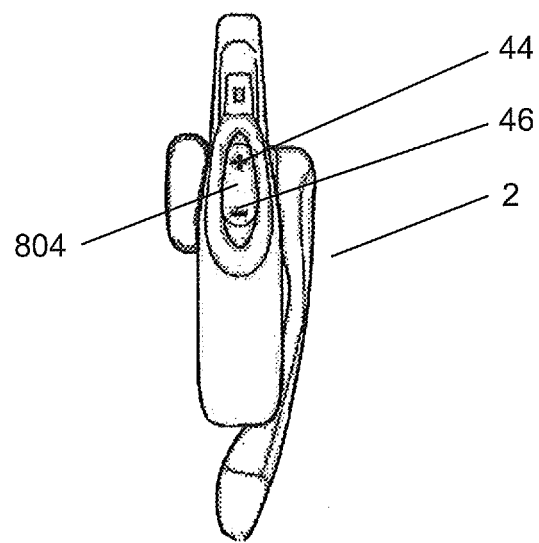

FIGS. 8A and 8B illustrate a front and side perspective view of the headset 2 shown in FIG. 2. Headset 2 includes a user interface such as rocker input 804 having a volume up input 44 and a volume down input 46. Headset 2 further includes a multi-functional button 802 operational as a call control button in normal operation mode and operational as a call transition function button during a call transition mode. One of ordinary skill in the art will recognize that a variety of user interface input mechanisms may be used which allow the user to input a call transition command, hookswitch command, menu navigation command, volume up command, and volume down command.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of communication network used by the telephones; protocols used to establish the wireless communication links between the headset and PC and mobile phone; standards to perform the VoIP call setup, signaling, and control; user interface input mechanisms to control call transition or hookswitch operation at the headset. For example, the communications networks used may be a PSTN, a public or private data network, wireline or wireless network, cellular network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset comprising:
a speaker;
a microphone;
a wireless communications transceiver operable to form a first local wireless link with a first telecommunications device and form a second local wireless link with a second telecommunications device;
a user interface; and
a processor operable to switch the headset to a call transition mode, wherein during the call transition mode the user interface is adapted to receive a transition call input action from a headset user, wherein responsive to the transition call input action the processor terminates a call with a call participant on the first telecommunications device and connects a call with the call participant on the second telecommunications device.

2. The headset of claim 1, wherein the first telecommunications device is a personal computer executing a VoIP application and the second telecommunications device is a mobile phone.

3. The headset of claim 1, wherein the wireless communications transceiver is a Bluetooth transceiver.

4. The headset of claim 1, wherein the processor switches the headset to the call transition mode responsive to a message received from the first telecommunications device.

5. The headset of claim 1, wherein the call transition mode is active for approximately five to ten seconds.

6. The headset of claim 1, wherein the transition call input action is a button press received at the user interface.

7. A method for transitioning a call using a headset comprising:
- establishing a first wireless link with a first telecommunications device;
- establishing a second wireless link with a second telecommunications device;
- conducting a call with a call participant over the first wireless link;
- entering a call transition mode, the call transition mode activating a transition call function command selectable at a headset user interface input;
- receiving an incoming call notification over the second wireless link;
- receiving the transition call function command selected at the headset user interface input; and
- responsive to receiving the transition call function command, terminating the call with the call participant over the first wireless link and connecting a call with the call participant over the second wireless link.

8. The method of claim 7, wherein entering a call transition mode is responsive to receiving a user action at the first telecommunications device and receiving an associated call transition message from the first telecommunications device.

9. The method of claim 7, wherein entering a call transition mode is responsive to receiving a user action at a headset user interface.

10. The method of claim 7, further comprising verifying the incoming call notification over the second wireless link is associated with the call with the call participant over the first wireless link.

11. The method of claim 7, further comprising continuing the call with the call participant over the second wireless link.

12. The method of claim 7, wherein the call transition mode is active for approximately five to ten seconds, following which the headset reverts to a normal operation mode suspending the transition call function command selectable at the headset user interface input.

13. A headset comprising:
- a speaker;
- a microphone;
- a wireless communications transceiver operable to form a first wireless link with a first telecommunications device and form a second wireless link with a second telecommunications device;
- a user interface;
- a processor;
- a memory storing a call transition application operable to switch the headset to a call transition mode, wherein during the call transition mode the call transition application terminates a call with a call participant on the first telecommunications device and connects a call with the call participant on the second telecommunications device upon receipt of an incoming call notification from the second telecommunications device.

14. The headset of claim 13, wherein the first telecommunications device is a personal computer operating a VoIP application and the second telecommunications device is a mobile phone.

15. The headset of claim 13, wherein the wireless communications transceiver is a Bluetooth transceiver.

16. The headset of claim 13, wherein the processor switches the headset to the call transition mode responsive to a message received from the first telecommunications device.

17. The headset of claim 13, wherein the call transition mode is active for approximately five to ten seconds.

18. A method for transitioning a call using a headset comprising:
- conducting a call with a call participant over a first wireless link with a first telecommunications device;
- entering a call transition mode, the call transition mode adapted to automatically transition a call upon receipt of an associated incoming call notification over a second wireless link with a second telecommunications device;
- receiving an incoming call notification over the second wireless link; and
- transitioning the call with the call participant from the first telecommunications device to the second telecommunications device.

19. The method of claim 18, wherein transitioning the call with the call participant comprises terminating the call with the call participant over the first wireless link and connecting a call with the call participant over the second wireless link.

20. The method of claim 18, further comprising verifying the incoming call notification over the second wireless link is associated with the call with the call participant over the first wireless link.

21. The method of claim 20, wherein verifying the incoming call notification over the second wireless link is associated with the call with the call participant over the first wireless link comprises matching caller identification data received with the incoming call notification to pre-determined identification data associated with the first telecommunications device.

22. The method of claim 18, wherein entering a call transition mode is responsive to receiving a user action at the first telecommunications device and receiving an associated call transition message from the first telecommunications device.

23. The method of claim 18, wherein entering a call transition mode is responsive to receiving a user action at a headset user interface.

24. The method of claim 18, wherein the first telecommunications device is a VoIP telephone, mobile cellular network telephone, or public switched telephone network telephone, and the second telecommunications device is a VoIP telephone, mobile cellular network telephone, or public switched telephone network telephone.

25. The method of claim 18, wherein the call transition mode is active for approximately five to ten seconds.

* * * * *